July 30, 1940.   D. T. BROCK   2,209,595
LIQUID PRESSURE BRAKING SYSTEM
Filed July 1, 1937   3 Sheets-Sheet 2

INVENTOR
D. T. Brock.
By
Lacey & Lacey,
Attys

July 30, 1940.  D. T. BROCK  2,209,595

LIQUID PRESSURE BRAKING SYSTEM

Filed July 1, 1937  3 Sheets-Sheet 3

INVENTOR
D. T. Brock.
By Lacey & Lacey,
Attys

Patented July 30, 1940

2,209,595

UNITED STATES PATENT OFFICE 2,209,595

LIQUID PRESSURE BRAKING SYSTEM

Denis Tabor Brock, London, England, assignor to Automotive Products Company Limited, London, England Application July 1, 1937, Serial No. 151,533
In Great Britain July 1, 1936

10 Claims. (Cl. 188—152)

This invention relates to liquid pressure braking systems of the kind in which the liquid pressure is produced in two stages, the first stage being a low pressure stage in which a comparatively large volume of liquid is forced into the liquid conduit and wheel cylinders to take up and slack in the brake system, and to apply the shoes to the drum, whilst the second stage is a high pressure stage in which very little further liquid is forced into the wheel cylinders, but a considerable pressure is applied to produce the actual braking effort.

This effect is obtained by providing a master cylinder having two chambers of different diameters, and a piston working in each of the chambers, the larger diameter piston which effects the low pressure stage being by some convenient means limited in its effective operation to the first part only of the braking operation, whereas the smaller diameter piston continues to move to produce the actual braking effort.

Liquid pressure braking systems of the kind above referred to are divided into two types, in one of which the change over from the low pressure to the high pressure stage is effected by the pressure in the system acting on suitable valves, and in the other of which the change over takes place at a predetermined point in the travel of the brake applying lever, foot pedal or the like, the movement of the low pressure piston ceasing or falling to an inconsiderable amount beyond this point, so that a pre-determined quantity of liquid is forced into the wheel cylinders to apply the brake shoes to the drum before the actual braking effort begins to be produced by the high pressure piston.

The present invention has for its primary object to provide an improved liquid pressure braking system of this latter type in which the pre-determined quantity of liquid displaced during the movement of the low pressure piston causes the brake linings always to arrive with their working faces in the same position relatively to the brake drums, whatever may be the degree of wear of the brake linings.

A further object of the present invention is to provide a master cylinder for a liquid pressure braking system of this type, which is extremely simple in design and is not dependent upon the functioning of valves or any pressure responsive device to obtain the correct change over from the low pressure to the high pressure stage.

According to the invention, a braking system of the latter type referred to has connected to the liquid conduit a chamber which receives a proportion of the constant volume of liquid displaced during the movement of the low pressure piston, the volume of said chamber increasing under the liquid pressure, and the extent to which the volume of said chamber is permitted to increase (and therefore the proportion of said displaced liquid received by said chamber) being adjustable.

According to a further feature of the invention, the high pressure piston of the master cylinder is operated directly by suitable means from the pedal, lever or the like which is used to apply the brakes, and the low pressure piston is operated indirectly by the high pressure piston or a part of its operating means, the arrangement being such that the low pressure piston moves comparatively rapidly during the first part of the brake application and then remains stationary or substantially stationary whilst the high pressure piston completes its stroke.

The low pressure piston is preferably operated by a cam formed on the high pressure piston and co-operating with a roller or other follower on the low pressure piston.

Preferably, the chamber connected to the liquid conduit is comprised by a cylinder and piston, the piston being shifted against spring influence by liquid pressure during operation of the low pressure piston of a compound master cylinder to increase the volume of the chamber as far as is permitted by an adustable stop.

When the master cylinder is operated to apply the brakes, the constant volume of liquid displaced during operation of the low pressure piston passes into the conduit connected to the wheel cylinders. Inasmuch as this conduit is also connected to the chamber mentioned above, the fluid so displaced moves the piston in the chamber and so increases the effective volume of the chamber as far as permitted by the adustment. The fluid also operates the pistons in the wheel cylinders to cause the brake shoes to approach the drum.

The invention is illustrated by the accompanying drawings of which:

Figure 4 is a view in vertical section of the master cylinder and reservoir unit of Figure 2, being taken substantially on the line 4—4 of Figure 2.

Figure 1:
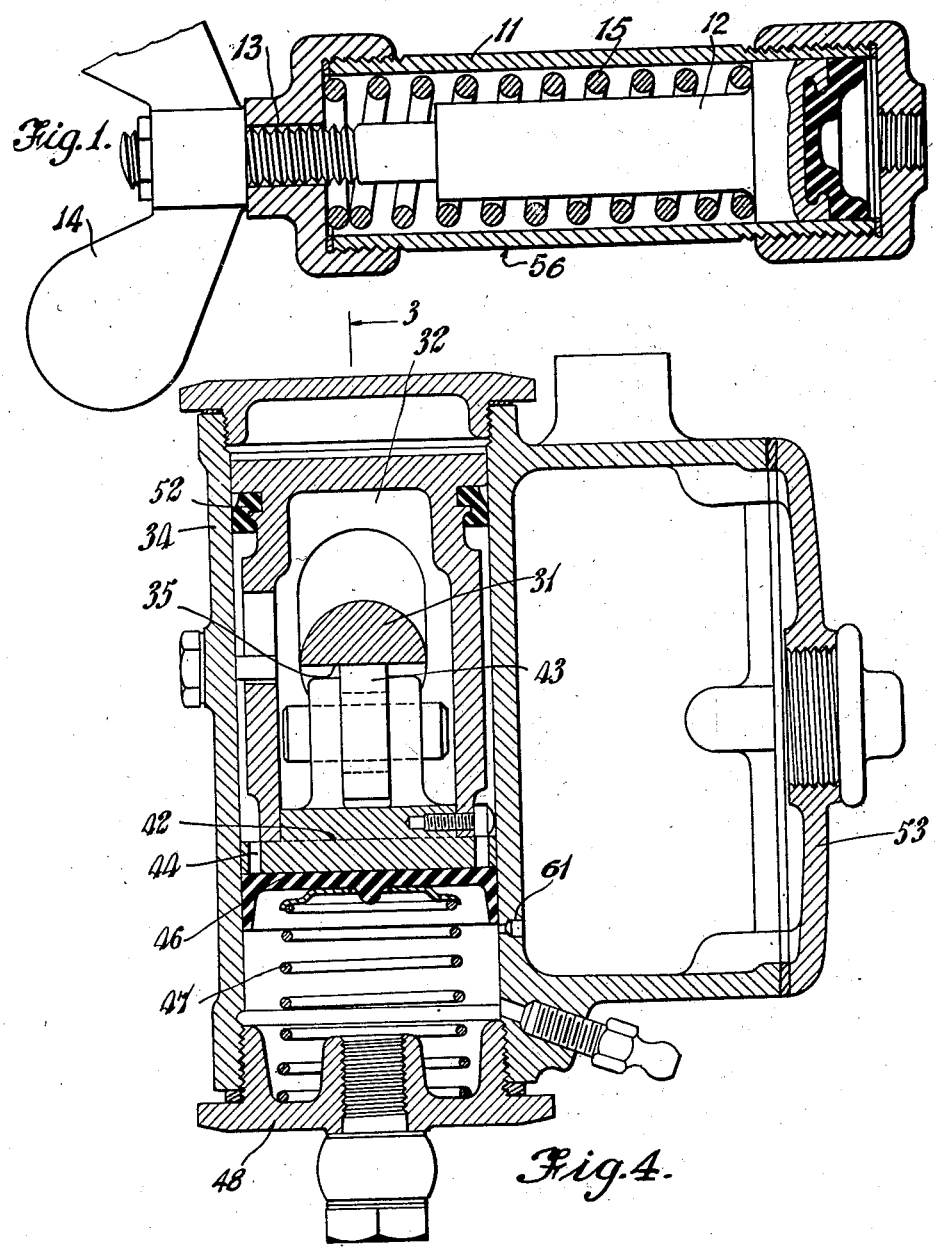
Figure 1 is a longitudinal sectional view of a variable volume or compensating chamber according to one form of the invention.

As shown in Figure 1, the chamber comprises a cylinder 11 and spring-influenced piston 12, which latter is provided with a threaded stem 13 on which is a wing nut 14 externally of the cylinder 11, by operation of which the available movement or stroke of the piston 12 can be limited to any desired extent, the wing nut 14 being screwed up to move the piston 14 against a return spring 15 and increase the initial or normal volume of the chamber and so decrease the permitted movement of the piston 12 against its spring 15. This increased initial or normal volume is automatically maintained filled with liquid from the reservoir of the system, so that on a subsequent operation of the master cylinder the piston 12 will be moved to a less extent, and a smaller proportion of the liquid displaced by the low pressure piston is permitted to pass into the chamber.

When new brake linings are fitted, the piston 12 is allowed its full movement, so that the maximum proportion of liquid enters the compensating chamber, since the clearance of the brake shoes is at a minimum. As the brake linings wear, the wing number 14 is screwed up to reduce the permitted movement of the piston 12, and consequently an increased proportion of the liquid passes to the wheel cylinders, with the result that a greater movement of the shoes takes place during the operation of the low pressure piston, and the linings are always moved into the same position relatively to the drum at the instant when the low pressure piston reaches the end of its movement.

Provided, therefore, that the extent to which the volume of the compensating chamber is permitted to increase during operation of the low pressure piston is adusted according to the wear of the brake linings, the liquid reaching the wheel cylinder during the movement of the low pressure piston will always be just sufficient to take up the slack in the system and bring the brake linings into contact with the brake drums, avoiding the necessity of the high pressure piston having a long travel to take up any extra clearance and equally avoiding the possibility of the shoes being applied to the drums before the low pressure piston has completed its movement, which would greatly increase the pedal effort by causing the large area low pressure piston to act at the higher pressure. The pedal travel needed to apply the brakes is thus always constant, since the point at which the low pressure piston ceases to deliver liquid is dependent only on the pedal travel.

Figure 2:
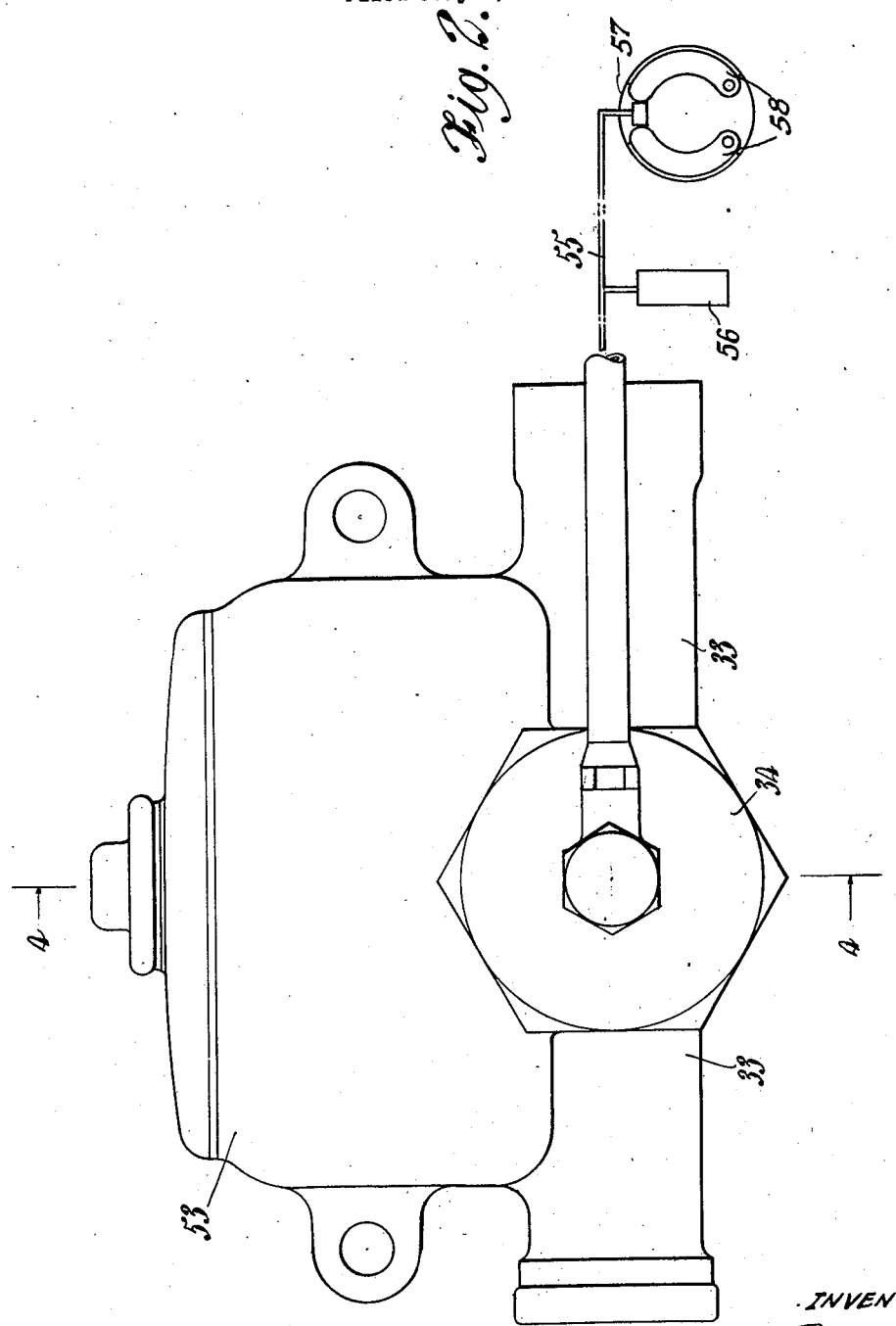
Figure 2 is a view in front elevation showing a preferred form of master cylinder and reservoir unit according to the invention, there being indicated diagrammatically on a reduced scale, the pipe connections from the master cylinder and reservoir units to the variable volume or compensating chamber and to a wheel chamber.
Figure 3:
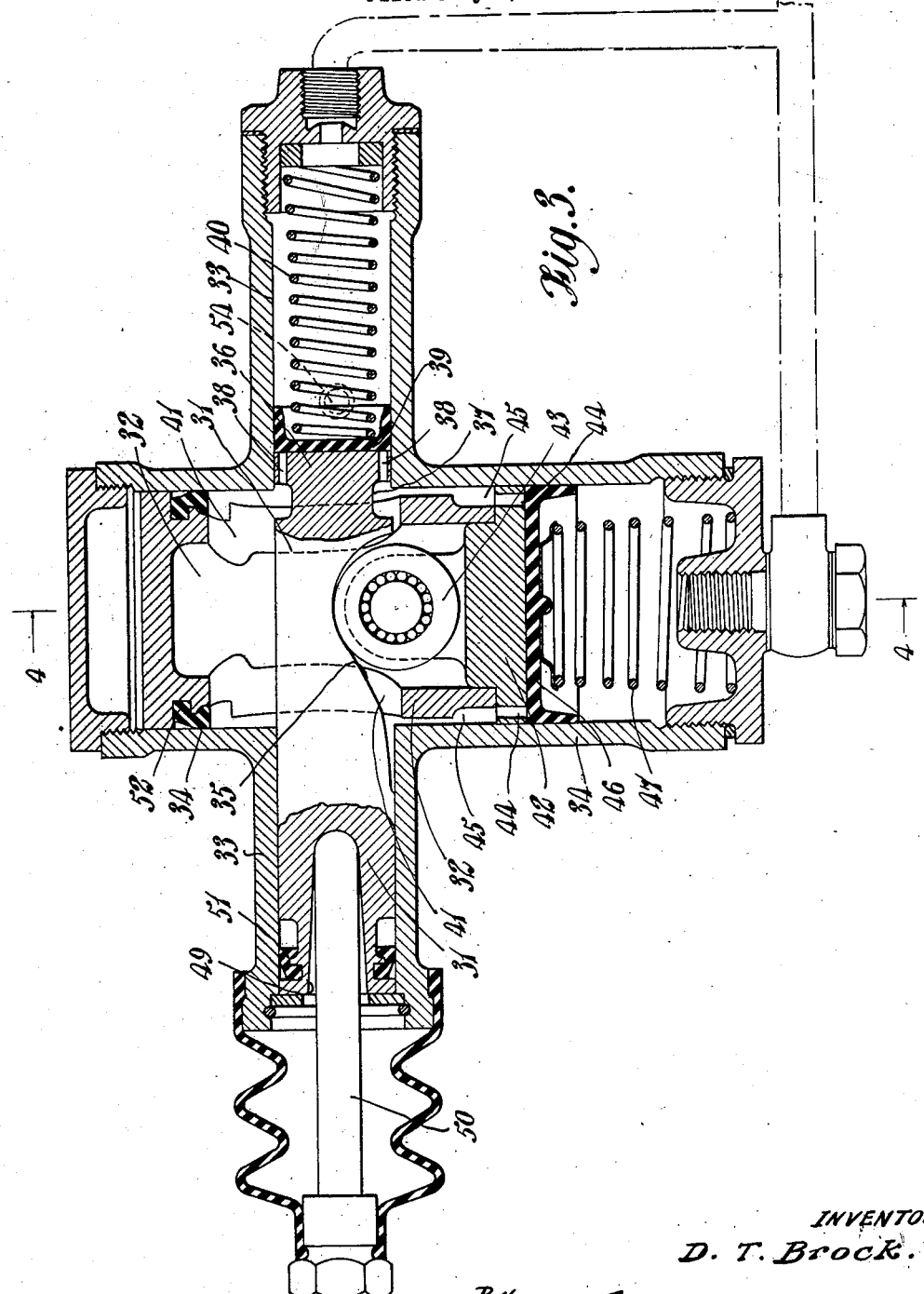
Figure 3 is a view in horizontal section of the master cylinder and reservoir unit shown in Figure 2, being taken on the line 3—3 of Figure 4.

In the preferred embodiment of master cylinder according to the invention as shown in Figures 2, 3 and 4 high and low pressure pistons 31 and 32, respectively, are disposed in two cylinders 33, 34 intersecting each other at right-angles, the axis of the two cylinders being in a common plane. The high pressure piston 31 is constituted by a solid cylindrical bar and extends diametrally through the bore of the low pressure cylinder 34, being cut away at one side of the part which extends through the low pressure cylinder 34 to provide a cam profile 35. The head 36 of this piston 31 extends into the high pressure cylinder 33 beyond the bore of the low pressure cylinder 34, and has an annular groove 37 just behind the head 36 and which is in communication with the face of the piston 31 through a series of longitudinal passages 38, and which, in the inoperative position of the piston 31, is open to the bore of the low pressure cylinder 34. A cup washer 39 is provided for sealing the high pressure piston 31, the cup 39 being held up against the face of the piston 31 by a coil spring 40 within the cylinder 33.

The low pressure piston 32 is of hollow cylindrical form and has apertures 41 in its skirt so that the high pressure piston 31 can pass through it. The low pressure piston 32 is built up, having a head 42 in addition to a skirt portion, the former of which carries on its rear face a mounting for a roller 43 which lies inside the hollow skirt of the piston and co-operates with the cam face 35 formed on the high pressure piston 21. The assembled piston 32 co-operates only at its ends with the wall of the low pressure cylinder 34, and its head 42 is bored longitudinally with a plurality of passages 44 connecting the annular space, indicated at 45, outside the piston 32 with the front face of the piston 32 which is sealed by a cupwasher 46 held thereagainst by a coil spring 47 taking its abutment on the cylinder head 48. At its rear end the high pressure piston has a deep recess 49 to receive the end of a push rod 50 by which the pistons 31 and 32 are connected in known or convenient manner to the operating pedal, hand-lever, or the like (not shown), and the pistons 31, 32 have sealing rings, indicated at 51 and 52, respectively, at or adjacent to, their rear ends, so that there is formed a closed cruciform chamber bounded by the packings and seals 39, 46, 51, 52 at the ends of the two pistons 31, 32, which, as will be easily realized, retain a constant volume despite the movements of the pistons 31, 32, because movement of either piston 31 or 32 merely displaces the space between its packings 39, 51 or 46, 52 and does not vary it. In the example illustrated the cruciform cylinder unit is mounted on the base of a liquid reservoir 53, which is connected by a port 16 with the part of the low pressure cylinder 34 between the two packings 46, 52 of the piston 32 therein, so that the cruciform space above referred to is kept always filled with fluid. The high pressure cylinder 33 is formed at a point which is just in front of the edge of the cup washer 39 when the piston 31 is in the retracted or normal position shown, with a vent hole, indicated at 54, opening into the reservoir 53, in order that the system can "breathe" freely, that is, so that liquid can pass from or to the reservoir 53 into or out of the system when it is inoperative to make up leakage or to allow extension of the liquid.

Pressure exerted on the pedal, lever, or the like (not shown), to apply the brakes, causes the thrust rod 50 to move the high pressure piston 31 longitudinally in its cylinder 33. As the piston 31 moves, the cam face 35 thereon moves past the roller 43 inside the low pressure piston 32, and causes that piston 32 also to move longitudinally in its cylinder 34. The cam face 35 is so formed that the low pressure piston 32 moves comparatively rapidly at first, and the two pistons 32 and 42 moving together force a considerable quantity of liquid into the conduit 55. From the conduits the fluid is forced into the brake cylinder of which one is indicated at 56 (Figure 3), and into the compensating chamber described above with reference to Figure 1 which is connected to the conduit 55 as indicated at 56 (Figure 2). In Figure 2 the brake drum and associated shoes associated with the cylinder 56 are indicated at 57 and 58, respectively. At a predetermined point in the stroke of the high pressure piston 31, however, the motion of the low pressure piston 32 ceases or becomes very small, the high pressure piston 31 continuing to move forward to produce the braking effort; the piston in the chamber 56 having reached the end of its permitted stroke. This cessation of movement of the low pressure piston 32 is effected by the arrival of the cam follower roller 43 in the low pressure piston 32 at the final portion of the cam face 35 which extends parallel to the direction of movement of the high pressure piston 31. The load on the low pressure piston 32 after it has become stationary, which will obviously rise as the force on the high pressure piston increases, is thus taken perpendicularly to the axis of the high pressure piston 31, and does not have to be overcome by the effort applied to the pedal, lever, or the like (not shown). Movement of the low pressure piston 32 ceases substantially simultaneously with the arrival of the brake shoe linings in contact with the drum provided the permissible volume increase of the chamber 51 is adjusted correctly. When the effort on the pedal, lever, or the like, is released, both pistons 31, 32 return to their inoperative positions under the influence of the usual brake return springs (not shown) in the brake cylinders 56, which springs also serve to retain the usual cup washers up against the pistons (not shown) of said cylinder 56.

The adustable compensating chamber according to the present invention may be used in association with or addition to any type of individual adjustment on each of the several brake shoe assemblies of a vehicle, the adjustable chamber affording a "single point" adjustment which may be used periodically to take up gradually the additional travel of the brake shoes due to wear of the linings, until the full available adjustment has been used, when the capacity of the chamber may be reset to its initial minimum so that the extent to which its volume may be increased by liquid pressure is restored to maximum, and the individual adjusters of the several brake shoe assemblies operated to move the shoes themselves into a new position closer to the drums, when the full range of adjustment of the chamber is again available.

It will be understood that the invention is not limited to the details described herein, other relative arrangements of the high and low pressure pistons being included, as well as other methods of effecting indirect operation of the low pressure piston during a part of the travel of the high pressure piston, and other arrangements and constructions of variable capacity liquid chamber.

I claim:

1. A liquid pressure braking system comprising drums, brake shoes, a compound master cylinder and piston unit including means for displacing during the initial stage of every brake operation a constant volume of liquid for the purpose of applying the brake shoes to the drums and including means for displacing additional liquid under higher pressure during a later stage of brake operation, a brake conduit connected to said master cylinder, means for reducing the effect of this constant volume of liquid displaced comprising a chamber having resilient means overcome by liquid pressure during said initial stage of brake operation and means for adjusting the effective size of said chamber in order that it may receive a variable amount of said constant volume of displaced liquid.

2. A liquid pressure braking system comprising a brake drum, movable brake elements, a compound master cylinder; a large diameter low pressure piston in said cylinder arranged to displace a constant volume of liquid to shift the movable brake elements into contact with the brake drum and then become substantially inoperative; a small diameter high pressure piston arranged to displace a very little additional liquid for actual braking; a liquid conduit connected to said master cylinder; a chamber connected to the liquid conduit which receives a proportion of the constant volume displaced by the operation of the low pressure piston, the volume of the chamber being increased by the liquid pressure; and means for adusting at will the extent of such volume increase which is permitted and therefore the proportion received by said chamber of the constant volume of liquid displaced by the low pressure piston, whereby the movable brake elements occupy substantially the same positions with regard to the drums at the point where the low pressure piston becomes substantially inoperative.

3. A liquid pressure braking system comprising brake drums, brake elements movable into contact with said drums, a compound master cylinder; a large diameter low pressure piston in said cylinder arranged to displace a constant volume of liquid to shift the movable brake elements into contact with the brake drums and then become substantially inoperative; a brake applying control; a small diameter high pressure piston arranged to displace a very little additional fluid for actual braking and connected to move with the brake applying control; means whereby motion is imparted to the low pressure piston through the medium of the connection of the high pressure piston with the brake control, so that the movement imparted to the low pressure piston is rapid during the first portion of the brake application and is then substantially zero while the high pressure piston completes its stroke, means comprising a variable volume chamber having resilient means normally overcome by the liquid pressure during movement of the low pressure piston for varying the time of termination of action of said low pressure piston relative to the time of application of said brake elements to said brake drums.

4. A liquid pressure braking system comprising drums, brake shoes, a compound master cylinder and piston unit including means for displacing during the initial stage of every brake operation a constant volume of liquid for the purpose of applying the brake shoes to the drums, a brake conduit connected to said master cylinder, and a chamber connected to the brake conduit, the effective volume of which is adjustable in order to receive a variable proportion of said constant volume of displaced liquid, said chamber comprising a cylinder, a piston, a spring, and an adjustable stop in which the piston is shifted within the cylinder against the spring by the pressure of liquid actuated on by the low pressure piston until the volume of said chamber is increased as much as is permitted by the adjustable stop limiting the stroke of the piston.

5. A liquid pressure braking system, as claimed in claim 4, wherein the cylinder of the chamber connected with the brake conduit is open to the latter at one end and the piston therein, which is sealed at that face directed towards said end, has a rod extending therefrom through the outer end of a cylinder; wherein said spring is a coiled compression spring surrounding said rod and urging the piston towards the conduit end of the cylinder; wherein said rod is formed with a stop intermediate of its length to contact with the end of the cylinder and so terminate the travel of the piston under liquid pressure; and wherein said rod has a wing nut in threaded relationship therewith outside the cylinder which may be screwed up to move and retain the piston against the spring and so adjust the permitted volume increase of the chamber.

6. A compound master cylinder comprising a pair of cylinders intersecting each other at right angles, a supply reservoir connected thereto, a high pressure piston in one cylinder, a low pressure piston in the other cylinder, a cam moving with one of said pistons and imparting motion to the other, the skirt of the low pressure piston and the walls of the low pressure cylinder being apertured to give passage to the high pressure piston, each piston being sealed at its rear end as well as at its face, and the low pressure piston cooperating at its ends, but not intermediately of its length, with the walls of the low pressure cylinder, so that there is provided, between the four seals of the pistons a cruciform space of constant volume for all positions of the two pistons which is connected with the supply reservoir for liquid.

7. A liquid pressure braking system comprising a reservoir, two cylinders which intersect one another substantially at right angles and which are connected to and mounted at the base of said reservoir, high and low pressure pistons disposed in said cylinders, the skirt of the low pressure piston and the walls of the low pressure cylinder being apertured to give passage to the high pressure piston, each piston being sealed at its rear end as well as at its face, and the low pressure piston cooperating at its ends, but not intermediately of its length, with the walls of the low pressure cylinder, so that there is provided, between the four seals of the pistons a cruciform space of constant volume for all positions of the two pistons which is connected with a supply reservoir for liquid.

8. A liquid pressure braking system comprising a compound master cylinder, brake drums, movable brake elements, a large diameter low pressure piston in said cylinder arranged to displace a constant volume of liquid to shift the movable brake elements into contact with the brake drums and then become substantially inoperative, a small diameter high pressure piston arranged to produce the effort for actual braking by the displacement of very little further liquid, a variable volume compensating chamber, wheel cylinders associated with said movable elements, and a brake conduit connected to the master cylinder, the wheel cylinders, and the compensating chambers.

9. A liquid pressure braking system comprising a master cylinder; a large diameter low pressure piston in said cylinder; a small diameter high pressure piston; a liquid conduit connected to said master cylinder; a chamber connected to the liquid conduit, said chamber having resilient means normally overcome by the liquid pressure during movement of the low pressure piston and means for adjusting the effective side of said chamber in order that it may receive a variable amount of said constant volume of displaced liquid; and means for adjusting the size of the chamber.

10. A liquid pressure braking system comprising brake drums, brake elements movable into contact with said drums, a compound master cylinder, a high pressure piston, a low pressure piston, a brake control, a connection between the brake control and the high pressure piston, means actuated by the connection for moving the low pressure piston, said last named means comprising a cam moving one of said pistons, means comprising a variable volume chamber having resilient means normally overcome by the liquid pressure during movement of the low pressure piston for varying the time of termination of action of said low pressure piston relative to the time of application of said brake elements to said brake drums.

DENIS TABOR BROCK.

CERTIFICATE OF CORRECTION.

Patent No. 2,209,595. July 30, 1940.

DENIS TABOR BROCK.

It is hereby certified that error appears in the printed specification of the above numbered patent requiring correction as follows: Page 2, first column, line 68, for the word "axis" read --axes--; same page, second column, line 46, for "port 16" read --port 61--; page 3, second column, line 68, claim 4, for the word "actuated" read --acted--; page 4, second column, line 26, claim 9, for "side" read --size--; line 39, claim 10, after "moving" insert --with--; and that the said Letters Patent should be read with this correction therein that the same may conform to the record of the case in the Patent Office.

Signed and sealed this 9th day of September, A. D. 1941.

(Seal)

Henry Van Arsdale,
Acting Commissioner of Patents.